(12) United States Patent
Johansson et al.

(10) Patent No.: US 12,026,763 B2
(45) Date of Patent: Jul. 2, 2024

(54) AUGMENTED REALITY CONVERSION SYSTEM

(71) Applicant: Inter IKEA Systems B.V., Delft (NL)

(72) Inventors: Niklas Johansson, Malmö (SE); Johan Bowald, Gothenburg (SE)

(73) Assignee: Inter IKEA Systems B.V., Delft (NL)

( * ) Notice: Subject to any disclaimer, the term of this patent is extended or adjusted under 35 U.S.C. 154(b) by 85 days.

(21) Appl. No.: 17/320,456

(22) Filed: May 14, 2021

(65) Prior Publication Data
US 2022/0366470 A1 Nov. 17, 2022

(51) Int. Cl.
*G06Q 30/0601* (2023.01)
*G06T 19/00* (2011.01)
*G06T 19/20* (2011.01)

(52) U.S. Cl.
CPC ..... *G06Q 30/0621* (2013.01); *G06Q 30/0643* (2013.01); *G06T 19/006* (2013.01); *G06T 19/20* (2013.01); *G06T 2210/04* (2013.01)

(58) Field of Classification Search
CPC ...... G06Q 30/0601–0643; G06Q 30/08; G06T 19/00; G06T 19/006; G06T 19/20; G06T 2210/04; G06F 30/00; G06F 30/10; G06F 30/12; G06F 30/13; G06F 30/15
See application file for complete search history.

(56) References Cited

U.S. PATENT DOCUMENTS

| | | | |
|---|---|---|---|
| 9,928,544 B1* | 3/2018 | Hasan | G06T 11/00 |
| 10,777,017 B1* | 9/2020 | Saiger | G06Q 30/0643 |
| 10,997,793 B1 | 5/2021 | Saiger et al. | |
| 11,113,883 B2* | 9/2021 | Zia | G06Q 30/0631 |
| 11,189,108 B2 | 11/2021 | Gustavsson et al. | |
| 11,257,297 B1* | 2/2022 | Go | G06Q 50/04 |
| 2002/0156694 A1* | 10/2002 | Christensen | G06Q 30/0621 705/26.5 |
| 2005/0081161 A1 | 4/2005 | Macinnes et al. | |

(Continued)

FOREIGN PATENT DOCUMENTS

| | | |
|---|---|---|
| CN | 108510597 A | 9/2018 |
| CN | 109564351 A | 4/2019 |

OTHER PUBLICATIONS

Mobile Augmented Reality to Enhance Customer Experience while Purchasing Furniture. Vivian Caroline Huang. Samuel Mahatmaputra Tedjojuwono. https://ieeexplore.ieee.org/stamp/stamp.jsp?tp=&arnumber=9211184. Aug. 14, 2020. (Year: 2020).*

(Continued)

*Primary Examiner* — William J Allen
(74) *Attorney, Agent, or Firm* — Merchant & Gould P.C.

(57) ABSTRACT

Methods and systems for an augmented reality conversion system. In one aspect, A augmented reality conversion system includes a computing device including a memory storage device, the memory storage device storing instructions that, when executed by the computing device, cause the computing device to generate and display a furnishing planner, receive inputs to select a furnishing product and one or more customizations for the furnishing product, and generate and display a machine-readable code which when scanned by an augmented reality device allows the augmented reality device to display the selected furnishing product with the one or more customizations in an augmented reality viewer.

17 Claims, 16 Drawing Sheets

(56) References Cited

U.S. PATENT DOCUMENTS

| | | | |
|---|---|---|---|
| 2011/0134108 A1 | 6/2011 | Hertenstein | |
| 2014/0232715 A1* | 8/2014 | Nigam | G06T 11/60 |
| | | | 345/419 |
| 2015/0310518 A1* | 10/2015 | Wang | G06Q 30/0621 |
| | | | 705/26.5 |
| 2016/0148433 A1 | 5/2016 | Petrovskaya et al. | |
| 2017/0011558 A1 | 1/2017 | Meier et al. | |
| 2018/0374276 A1 | 12/2018 | Powers et al. | |
| 2019/0188915 A1 | 6/2019 | Meier et al. | |
| 2019/0197599 A1* | 6/2019 | Zia | G06Q 30/0641 |
| 2021/0248669 A1* | 8/2021 | Wade | G06F 3/011 |
| 2022/0083707 A1* | 3/2022 | Santhar | G06F 30/20 |
| 2022/0092857 A1* | 3/2022 | Haapoja | G06Q 30/0643 |
| 2022/0114653 A1* | 4/2022 | Boghossian | G06Q 20/12 |

OTHER PUBLICATIONS

J. Mings, "Must Have App: Augment Puts Your 3D Models Anywhere You Please", retrieved from https://www.solidsmack.com/apps/must-have-app-augment-puts-your-3d-models-anywhere-you-please/ (2013).

European Search Report for EP Application No. 19206700.7 mailed Apr. 22, 2020 (12 pages).

Tang et al. "AR Interior Designer: Automatic Furniture Arrangement using Spatial and Functional Relationships." IEEE, 2014 Conference on Virtual Systems & Multimedia. (2014) pp. 345-352.

Izadinia et al. "IM2CAD" IEEE Conference on Computer Vision and Pattern Recognition. (2017) pp. 2422-2431.

Kan et al. "Automated Interior Design Using a Genetic Algorithm." Virtual Reality Software and Technology_ (2017) pp. 1-10.

Izadinia, Hamid; 2017 IEEE Conference on Computer Vision and Pattern Recognition (CVPR); IM2CAD; Jul. 21, 2017, pp. 2422-2431.

Notification of Transmittal of the International Search Report and the Written Opinion of the International Searching Authority for International Application No. PCT/EP2022/06311 mailed on Sep. 14, 2022 (12 pgs).

* cited by examiner

AUGMENTED REALITY CONVERSION SYSTEM

BACKGROUND

Furnishing products are often purchased online. It is common for furnishing products to include various customizations. For example, a customer may request a furnishing with a size, color, or material customization. Some furnishings include more complex customizations. For example, a customer may customize a built-in closet to include various storage components and arrangements. In some examples, a customer may use a furnishing planner to arrange multiple furnishing products or make customizations to a furnishing product.

Customers sometimes view products in augmented reality. Augmented reality allows a user to view an object at home. Phones and tablets may include native augmented reality functionality using a built-in camera. This allows a customer to view an object in augmented reality without the need to purchase any specialized equipment.

SUMMARY

In general terms, this disclosure is directed to an augmented reality conversion system. In some embodiments, and by non-limiting example, the augmented reality conversion system is part of an e-commerce system.

One aspect is a system comprising a computing device including a memory storage device, the memory storage device storing instructions that, when executed by the computing device, cause the computing device to generate and display a furnishing planner, receive inputs to select a furnishing product and one or more customizations for the furnishing product, and generate and display a machine-readable code which when scanned by an augmented reality device allows the augmented reality device to display the selected furnishing product with the one or more customizations in an augmented reality viewer.

Another aspect is a method comprising generating and displaying a furnishing planner, receiving inputs selecting a furnishing product and one or more customizations for the furnishing product, and generating and displaying a machine-readable code which when scanned by an augmented reality device allows the augmented reality device to display the selected furnishing product with the one or more customizations in an augmented reality viewer.

A further aspect is a method comprising scanning a machine-readable code, wherein the machine-readable code is generated by a furnishing planner on a computing device which receives inputs to create a customized furnishing, and generating an augmented reality viewer which includes displaying the customized furnishing based on the scanned machine-readable code.

DETAILED DESCRIPTION

Figure 1:
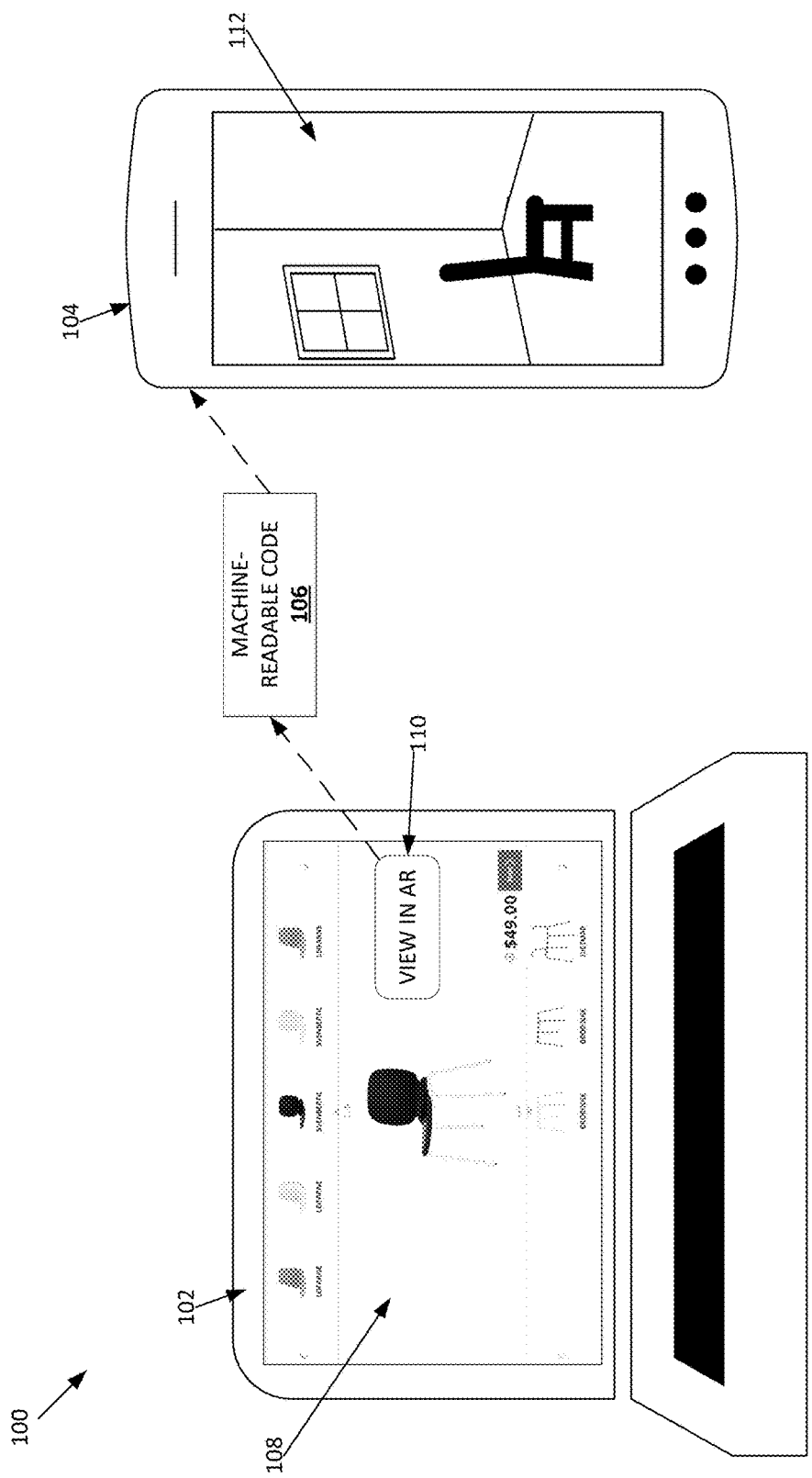
FIG. 1 illustrates an example augmented reality conversion system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to an augmented reality conversion system. In some embodiments, and by non-limiting example, the augmented reality conversion system is part of an e-commerce system. Although the disclosure focuses on augmented reality technology the systems and methods disclosed can also be used with mixed reality, virtual reality, and other related technologies.

FIG. 1 illustrates an example augmented reality conversion system 100. The system 100 includes a furnishing planner device 102 and an augmented reality device 104. The furnishing planner device 102 includes a furnishing planner 108 and an augmented reality transfer service 110. The augmented reality transfer service 110 encodes a machine-readable code 106.

The augmented reality conversion system 100 includes the furnishing planner device 102. The furnishing planner device 102 operates to execute the furnishing planner 108. The furnishing planner device 102 includes a display device for presenting a UI for the furnishing planner 108 and an I/O device for receiving inputs. In many examples, the display device and the I/O device on the furnishing planner device 102 provide the ability to make complex furnishing selections and customizations. For example, a customer may want to interact with the furniture planner on a larger screen which has enough display size to make the desired modifications. Accordingly, the furnishing planner device 102 is a desktop computer with a mouse and keyboard, laptop with a touchpad and keyboard, or a kiosk computing system. However, in other embodiments the furnishing planner device 102 could be a mobile computing device such as a smart phone or a tablet. Other computing devices are also possible.

The furnishing planner device 102 includes a furnishing planner 108. The furnishing planner 108 operates to allow a user to make furnishing selections and customization selections. Examples of furnishing planners includes wardrobe planners, kitchen planners, bathroom planner, bedroom planners, bed planners, sofa planners, storage system planners, curtain planners, etc.. Typically, a user selects one or more furnishing items from a catalog of furnishing items. For each selected furnishing items, a user makes one or more customizations. In the example shown, a user may select a chair and make customizations based on colors and materials used. In some examples, the customizations are complex. For example, a user can select items for a customized closet including customized sizing, shelving, color, materials, and layout. An example of the furnishing planner 108 is described in FIG. 5.

The furnishing planner device 102 includes an augmented reality transfer service 110. The augmented reality transfer service 110 transfers one or more customized furnishing products to the augmented reality device 104. In some examples, the furnishing planner device 102 is not suitable or optimized for viewing a customized furnishing in AR (for example, a desktop or a stationary kiosk). The augmented reality transfer service 110 operates to transfer the customized furnishing to a device which is suitable or optimized for viewing in AR (for example, a smart phone, AR glasses, or a virtual reality device).

The augmented reality transfer service 110 encodes a machine-readable code 106. Examples of the machine-readable code 106 include a quick response (QR) code, a 1D Bar code, and a 2D Bar code. The machine-readable code 106 is scannable by the augmented reality device 104 and provides information which allows the augmented reality viewer 112 to display the customized furnishing in AR.

The augmented reality device 104 is a computing device which operates to view an object in augmented reality. In some examples, the augmented reality device 104 is a mobile computing device such as a cellular smart phone, a tablet, or AR glasses. In other examples, the augmented reality device 104 is a virtual reality computing device. Typically, the augmented reality device 104 is easily moved around a room by a user and includes a camera which captures images which are used by the augmented reality viewer 112. In some examples the augmented reality device 104 is a mobile device, such as a phone or tablet. which has native AR functionality built by the manufacturer of the device. In some examples, the AR functionality is implemented in a $3^{rd}$ party application running on the mobile device.

The augmented reality device 104 includes an augmented reality viewer 112. The augmented reality viewer 112 displays an augmented reality scene, typically, by overlaying a virtual object over images received from a camera on the augmented reality device 104. In some examples, the augmented reality viewer 112 receives inputs from a user placing an object to appear at a specific location of a room at a specific orientation.

Figure 2:
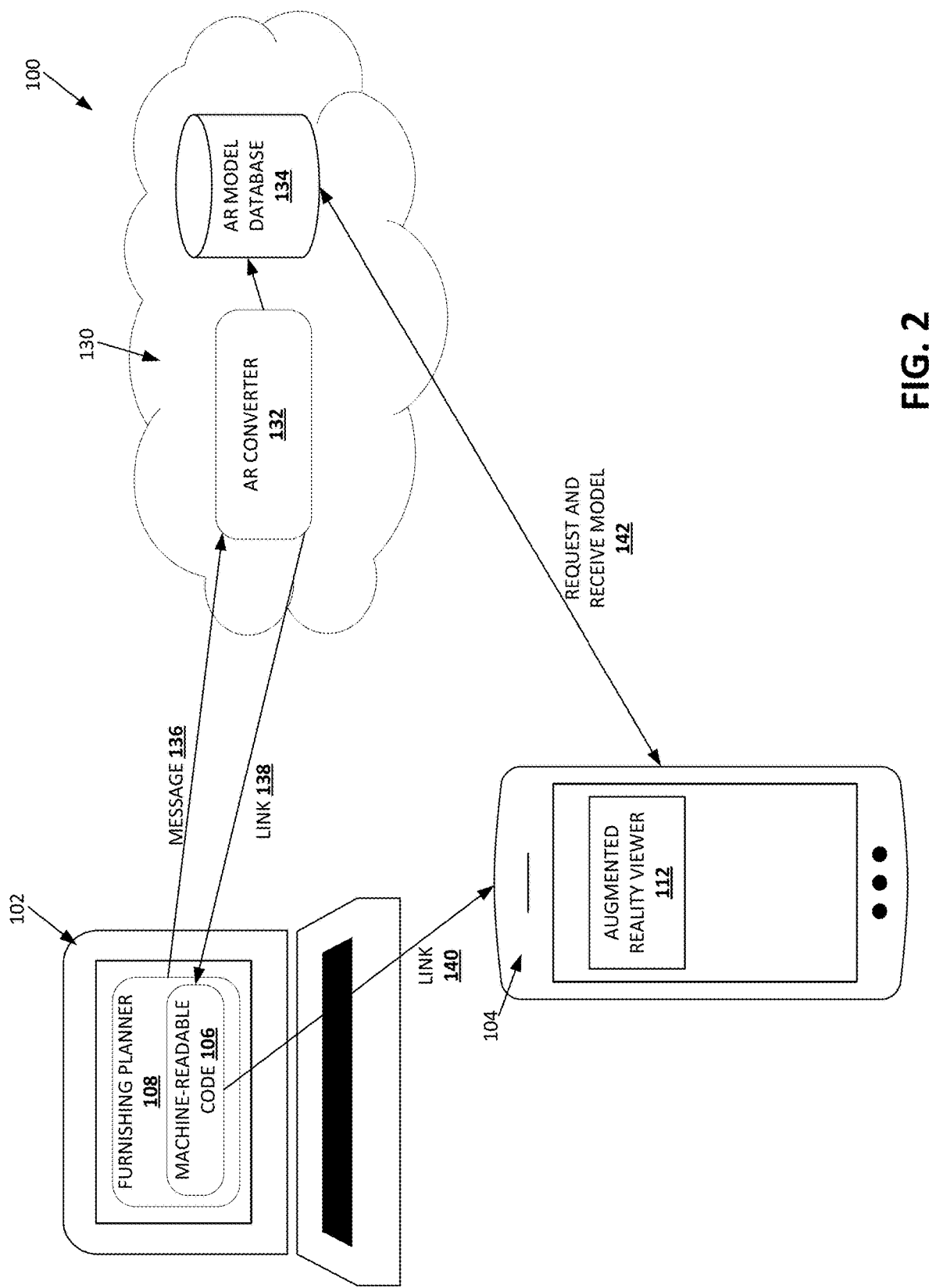
FIG. 2 illustrates an example augmented reality conversion system.

FIG. 2 illustrates example augmented reality conversion system 100. The system 100 includes a furnishing planner device 102, an augmented reality device 104, and an augmented reality conversion service 130. The furnishing planner device 102 and the augmented reality device 104 operate similar to the furnishing planner device 102 and augmented reality device 104 illustrated and described in FIG. 1.

The furnishing planner device 102 includes a furnishing planner 108 which encodes a machine-readable code 106. In some examples, the furnishing planner device 102 establishes a communication channel with the augmented reality conversion service 130. The communication channel is over a data communications network. In some examples, the network is a public network such as the Internet.

The furnishing planner sends a message 136 to the augmented reality conversion service 130 over the communication channel. The message 136 describes one or more furnishing models, furnishing positions, furnishing customizations and modifications, and other descriptive information about the furniture item and customizations. In some examples, the user makes selections for a furnishing product and makes one or more customizations to the product. These selections are included in the message 136.

In the example shown, the furnishing planner 108 sends a message 136 describing the user selected furnishings with the user selected customizations to the augmented reality converter 132 in the augmented reality conversion service 130. The augmented reality converter 132 responds with a message containing a link 138 to an AR model of the selected furnishing items with the selected customizations.

In the embodiment shown, the furnishing planner 108 encodes a machine-readable code 106 which includes a link 140 to the AR model in the augmented reality conversion service 130. In some embodiments, the machine-readable code is an optical label. In the example shown, the augmented reality device 104 scans the machine-readable code 106 with a built-in camera and downloads an augmented reality model (communication channel 142) of the customized furnishing from a link 140 embedded in the machine-readable code 106.

The system 100 further includes an augmented reality conversion service 130. The augmented reality conversion service 130 comprises one or more computing devices which operate an augmented reality converter 132 and an model database 134. The augmented reality conversion service 130 typically runs on one or more servers. In the example shown, the augmented reality conversion service 130 operates an augmented reality converter 132 and an augmented reality model database 134.

The augmented reality converter 132 converts selected furnishings with customizations into an AR model format. In the example, shown the augmented reality converter 132 receives a message 136 which describes a furnishing with selected customizations. In some embodiments, the message 136 is in a text format. For example, the message 136 may be in a JSON format. In other examples the message 136 includes a 3D model of the customized furnishing. The augmented reality converter 132 converts the selected furnishing and selected customizations into a model in an AR format.

In some examples, augmented reality converter 132 generates a 3D model. For example, the 3D model format "gITF". This model is stored in the augmented reality models database 134 with a specific link. For example, the model may be stored with a specific URL or with a specific ID. In other examples, the augmented reality converter 132 coverts the model described in the message into an augmented reality format, such as USDZ. Other examples include other augmented reality formats.

In a typical example the augmented reality converter 132 receives the message 136 which describes the customized furnishing. The augmented reality converter 132 is configured with a model database 134, which stores model of furnishings. The Augmented reality converter 132 selects one or more models of furnishing items and combines the models to create a customized furnishing. For example, the models may include a wardrobe which is combined with several shelves and hanging racks to create the customized furnishing based on the description in the message. In some examples, the customized model is then stored in the model database 134.

The model database 134 stores furnishing models and associated information. Examples of furnishing models includes 3D models and AR models. In some examples, the augmented reality model database 134 includes models in several different AR formats. In some embodiments, the model database 134 contains models for non-customized furnishings. In different examples, the models can be 3D models, AR models, or both. For example, the model database 134 may contain 3D models for a standard table and chairs, and/or standard components of a wardrobe. Additionally, the model database 134 may update on the fly with customized furnishing AR models as users create and upload customized furnishings from various furnishing planner devices. In some embodiments the model database 134 contains furnishings in different AR formats, which allows the furnishing to be displayed in different AR applications. In some examples, the standard furnishing models are in a 3D model format and the converted customized furnishing models are in one or more different AR formats. In some embodiments, the model database 134 comprises one or more databases and file systems. Other embodiments are possible as well.

Figure 3:
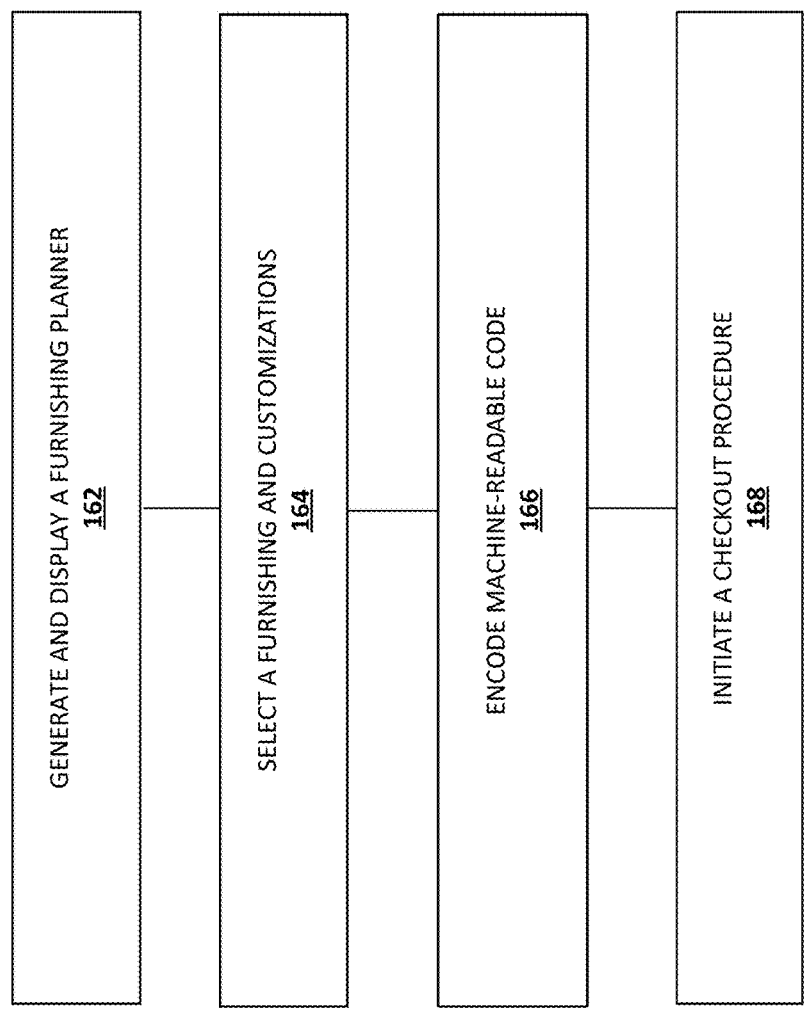
FIG. 3 illustrates an example method for transferring a customized furnishing to an augmented reality viewer.

FIG. 3 illustrates an example method 160 for transferring a customized furnishing to an augmented reality viewer. In some examples, the method 160 is executed on the furnishing planner device 102 illustrated in FIG. 1. The method 160 includes the operations 162, 164, 166, and 168.

The operation 162 generates and displays a furnishing planner. The furnishing planner allows a customer to modify and configure a furnishing virtually. In some embodiments, the furnishing planner is displayed on a device with a large screen and I/O which allows the user to easily make customizations to furnishings. For example, the furnishing planner may be displayed on a desktop, laptop, or a kiosk.

The operation 164 selects a furnishing and customization for the furnishing. In some examples, the furnishing planner will display a catalog of furnishings which are selectable by a user. After a user selects a furnishing, a menu of possible customizations is presented to the user. The customizations, typically, depend on the furnishing selected. For example, if the customer selects a wardrobe unit options for adding shelves, doors, interior, lights are presented, and if a user selects a table options for modifying the legs of the table are presented. In some examples, a user can select multiple furnishings and select one or more customizations for each selected furnishing.

The operation 166 encodes a machine-readable code. The machine-readable code when scanned allows an AR viewer to display the selected furnishing with customizations. In some examples, the operation 166 encodes a link to a model of the customized furnishings. In other examples the operation 166 encodes a description of the selected furnishing and customizations. Examples of the machine-readable code include a quick response (QR) code, a 1D Bar code, and a 2D Bar code.

The operation 168 initiates a checkout procedure. The checkout procedure includes allowing the user to add the customized furnishing to a checkout cart, receiving inputs for delivery and payment, and processing payment details. Other embodiments of checking out an online order are possible as well.

Figure 4:
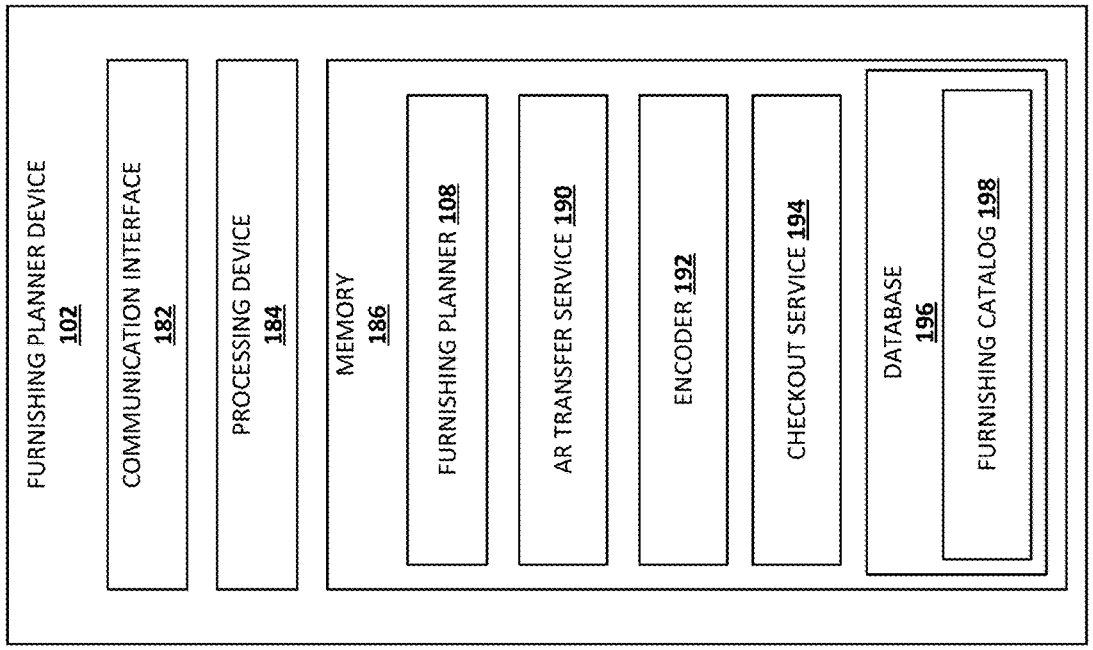
FIG. 4 illustrates an example furnishing planner device.

FIG. 4 illustrates an example furnishing planner device 102. The example furnishing planner device 102 includes a communication interface 182, a processing device 184, and a memory 186. Typically, the furnishing planner device 102 is a computing device such as a desktop, laptop, or kiosk.

The communication interface 182, operates to allow the furnishing planner device to communicate with the augmented reality conversion service. The communication interface 182 can also operate to allow the furnishing planner to communicate one or more servers to execute the furnishing planner, for example execute the server side of the furnishing planner application. The communication interface 182 can also communicate with other online shopping services. Typically, the communication interface 182 interfaces with a private or public network.

Figure 16:
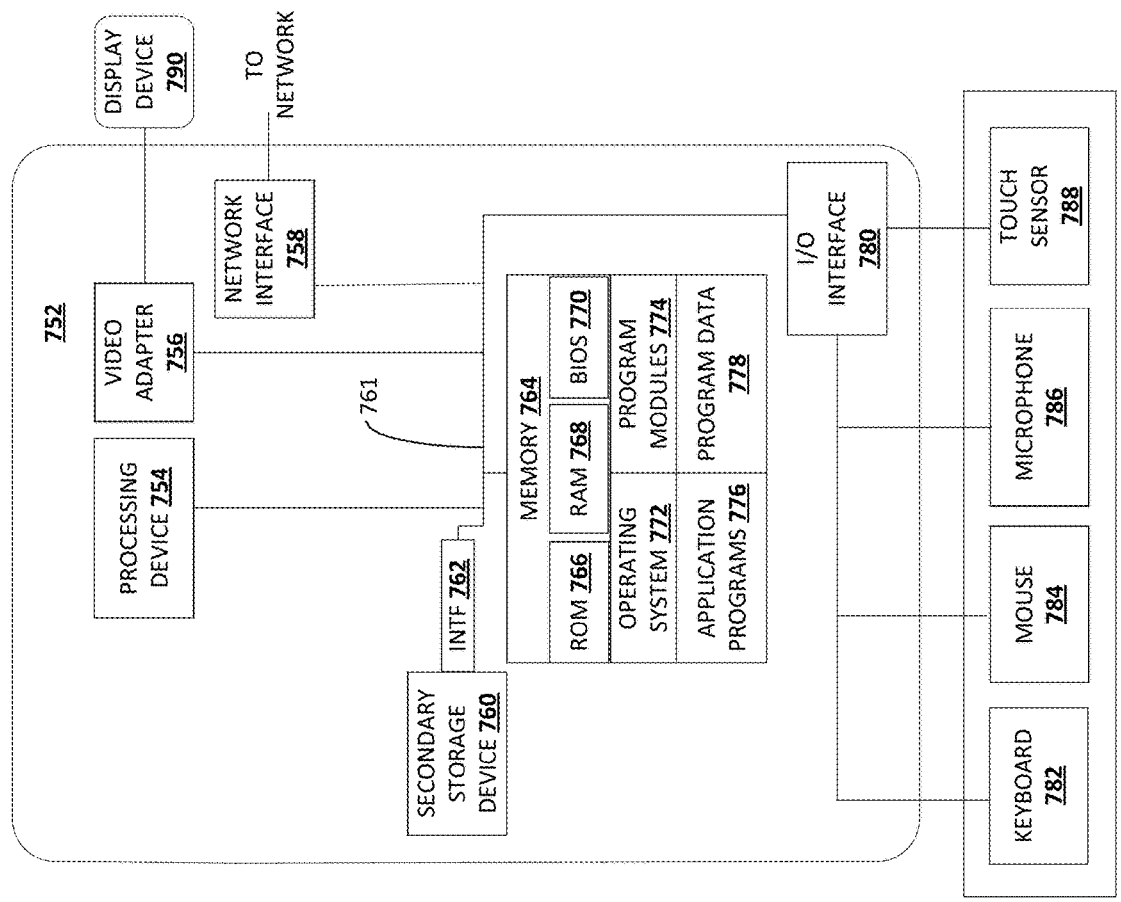
FIG. 16 illustrates an exemplary architecture of a computing device.

Examples of the processing device 184 and the memory 186 are described in reference to FIG. 16.

In the embodiment shown, the memory 186 executes a furnishing planner 108, an augmented reality transfer service 190, an encoder 192, and a checkout service 194.

The furnishing planner 108 operates to allow a user to select, arrange, and customize furnishings. The furnishing planner 108 typical presents a user interface which allows a user to plan a furnishing piece or layout. Example user interfaces are illustrated and described in reference to FIG's 8-9. The furnishing planner 108 is illustrated in greater detail in reference to FIG. 5.

The augmented reality transfer service 190 operates to transfer a customized furnishing to an augmented reality device. In some embodiments the augmented reality transfer service 190 sends a message to an AR conversion service. The message describes one or more customized furnishings selected by the user. In some examples, a user selects a button to being the transfer process. In other examples, the augmented reality transfer service 190 sends a message describing the selected furnishings and customizations to an AR device.

The encoder 192 operates to generate a machine-readable code. The machine-readable code when scanned by the AR device allows the AR device to display an AR scene including the customized furnishing. In some examples, encoder 192 encodes a link to an AR model stored in a model database. In other examples, the encoder 192 sends a message describing one or more customized furnishings.

The checkout service 194 operates to allow a user to checkout a furnishing item. In some examples, the checkout service 194 allows a user to add customized and standard furnishings to a cart. The checkout service 194 collects shipping and payment information from the user and processes the order.

The memory 186 can further operate a database 196. In some embodiments, the database 196 stores data related to the furnishing planner 108, the AR transfer service 190, the encoder 192, and the checkout service 194. The database 196 can also store other information relevant to an e-commerce application. In some examples, the database 196 contains a furnishing catalog 198.

The furnishing catalog 198 includes a catalog of products stored on the e-commerce application. In many examples, the furnishing catalog 198 also includes a set of customizations possible for one or more of the furnishing products in the catalog of products. In some examples the furnishing catalog 198 includes all the products from a single store. In some embodiments, the furnishing catalog 198 includes only products which are currently in stock.

Figure 5:
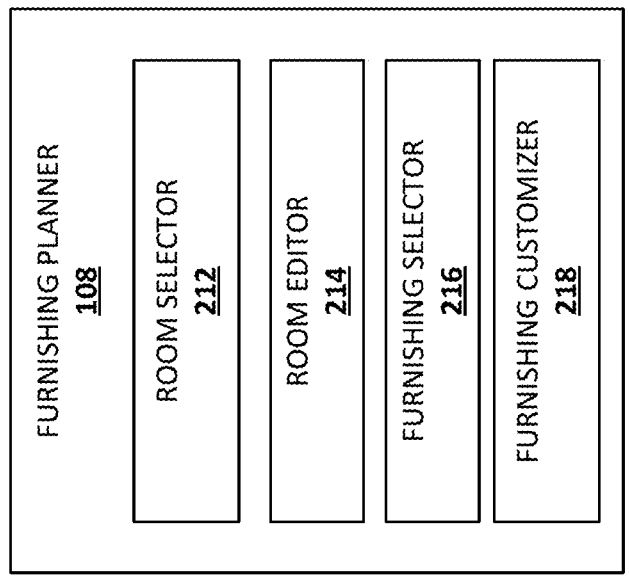
FIG. 5 illustrates an example furnishing planner.

FIG. 5 illustrates an example furnishing planner 108. In some examples, the furnishing planner 108 includes a room selector 212, a room editor 214, a furnishing selector 216, and a furnishing customizer 218.

In some embodiments, the furnishing planner 108 includes a room selector 212. The room selector 212 operates to allows customer to select a room for placing one or more furnishings. In some examples, the room selector 212 displays a list of predefined rooms a user selects. In some examples, the room selector 212 allows the user to create a customized room. In some embodiments, a user can select a predefined room or select an option to customize a room.

In some embodiments, the furnishing planner 108 includes a room editor 214. The room editor 214 operates to allow a user to edit a room. Examples of edits made by the room editor 214 include changing the wall color in a room, the placement of fixtures, and the dimensions of the room.

The furnishing planner 108 includes furnishing selector 216. The furnishing selector 216 presents a catalog of furnishing products. The user is able to select one or more furnishing products from the catalog of furnishing products. In some examples, a user places the selected furnishing product in a specific location in a room. In other examples, the furnishing product is automatically placed in the room. Additionally, in some embodiments, multiple furnishings are arranged together within a room.

The furnishing planner 108 includes a furnishing customizer 218. The furnishing customizer 218 presents customizations for one or more selected furnishings. Examples of customizations include color, material, and layout. In the example, of a wardrobe the user may select different types of shelves and place the shelves at different positions. The user may also select different light styles and place the lights inside the wardrobe. A person of ordinary skill of the art would realize that the customizations for furnishings creates a large number of different possible combinations, and in some examples, a predefined database would not include every possible customization or arrangement.

In some examples, the furnishing customizer 218 manages the customizations presented to a user. For example, the possible customizations depend on the furnishing selected. For example, the customization options for a table may only include color and material and the customization options for a chair include color, material, and height.

Figure 6:
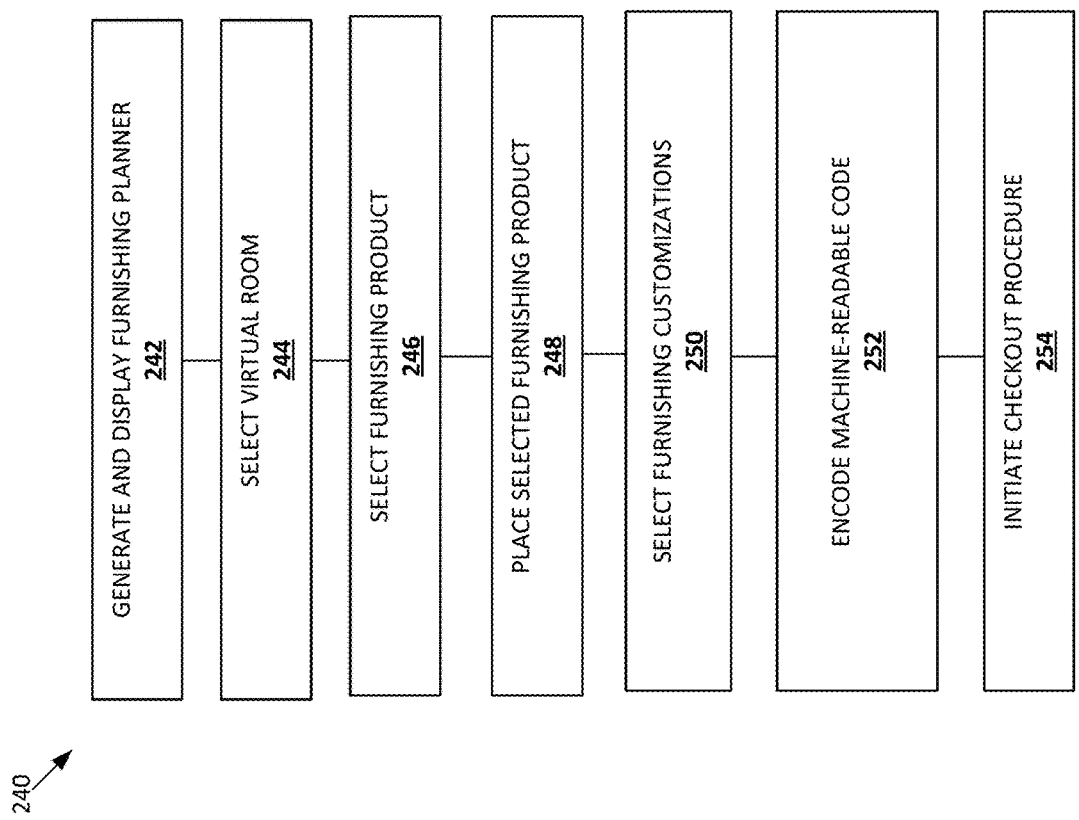
FIG. 6 illustrates an example method for selecting a customized furnishing.

FIG. 6 illustrates an example method 240 for selecting a customized furnishing. The method 240 includes the operations 242, 244, 246, 248, 250, 252, and 254.

The operation 242 generates and displays a furnishing planner. In some examples, the furnishing planner is included with an e-commerce application. For example, a user may browse an e-commerce website searching for furnishing options and a UI element is presented which prompts the user to enter the furnishing planner. An example of UI for a furniture planner are illustrated and described in reference to FIGS. 8 and 9.

The operation 244 selects a virtual room. In some examples, the furnishing planner will prompt a user to select a virtual room from a list of different rooms. In other examples, the user may create a customized virtual room. In further examples, a default virtual room is automatically presented to a user.

The operation 246 selects a furnishing product. In some examples, a catalog of furnishing products is presented to a user inside the furnishing planner. In other examples, a user first selects a product and then enters the furnishing planner. The user can also select multiple furnishing products to create an arrangement of products in the virtual room.

The operation 248 places a selected furnishing product in the virtual room. In some embodiments, a user places the selected product in a specific location in a room at a specific orientation. In other examples, a furnishing is automatically placed in a location in the room. In the typical example, the user will use an I/O device to drag and drop the furnishing product and modify the orientation of the product.

The operation 250 selects furnishing customizations. The user uses an I/O device to select a furnishing item. When a furnishing item is selected a menu of possible customizations are presented. In some examples, the users can place the customization on the furnishing product. For example, if the user selects a wardrobe the options of customizations can include a shelf which the user can place at a desired location in the wardrobe. In other examples, selecting the customization will automatically modify the furnishing product. For example, selecting a color will automatically change the color of a furnishing product. In some examples, a user selects furnishing customizations before placing the furnishing product in a virtual room.

The operation 252 encodes machine-readable code. When the machine-readable code is scanned by an augmented reality device it allows an augmented reality viewer to display the customized furnishing in AR. In some examples, the operation 252 encodes a QR code.

The operation 254 initiates a checkout procedure. The user can select an option to add the customization to a checkout cart. Selecting this option will add the furnishing with each customization to the cart. Additionally, the operation 254 can collect payment and delivery/pickup details and process the order. Further, examples of checkout procedures are described herein.

Figure 7:
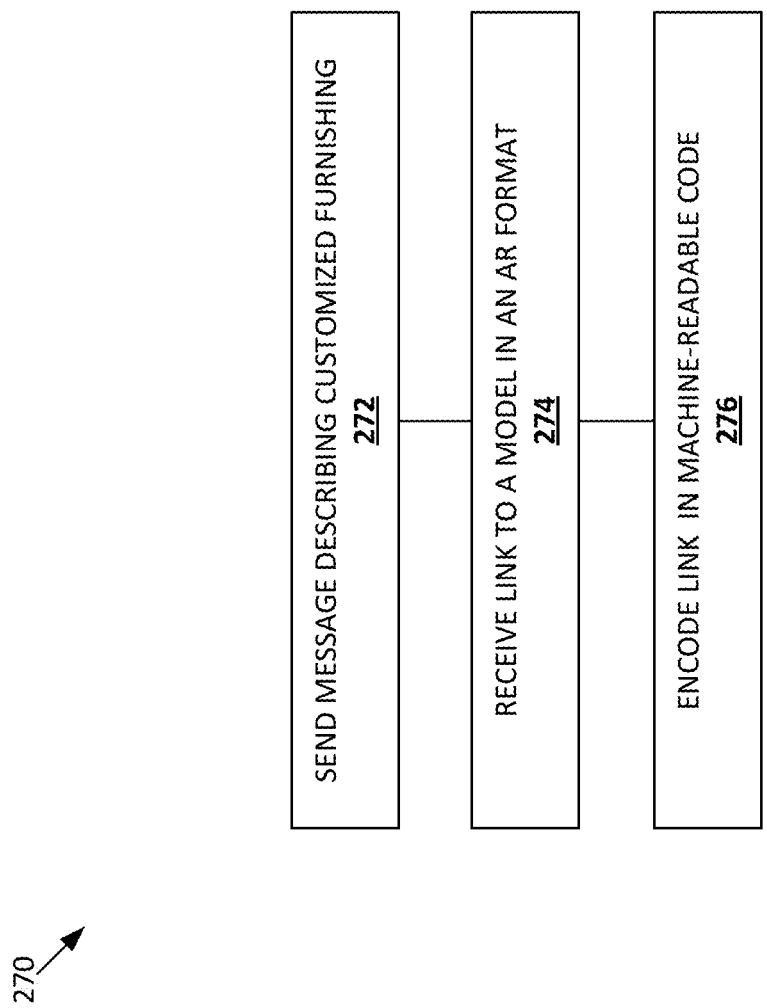
FIG. 7 illustrates an example method for transferring a customized furnishing to an augmented reality viewer.

FIG. 7 illustrates an example method 270 for transferring a customized furnishing to an augmented reality viewer. The method 270 includes the operations 272, 274, and 276. In some examples, the method 270 is performed by the furnishing planner device 102 illustrated and described in FIG. 1.

The operation 272 sends a message describing a selected furnishing and customizations to an augmented reality conversion service. The message describes the furnishing ID and details to describe each customization made to the furnishing. In some examples the message is sent in a JSON format. In other examples, the message includes a 3D or AR model of the customized furnishing.

The operation 274 receives a link to a model in an AR format. Typically, the link is a URL which when entered returns a 3D model of the of the customized furnishings. Other examples of links include an ID which is used to query a database to return a 3D or AR model of the customized furnishing.

The operation 276 encodes the link into a machine-readable code. In some examples, the operation 276 encodes the link into a QR code. Other machine-readable codes are also within the scope of this disclosure. The machine-readable code is scannable by AR device.

Figure 8:
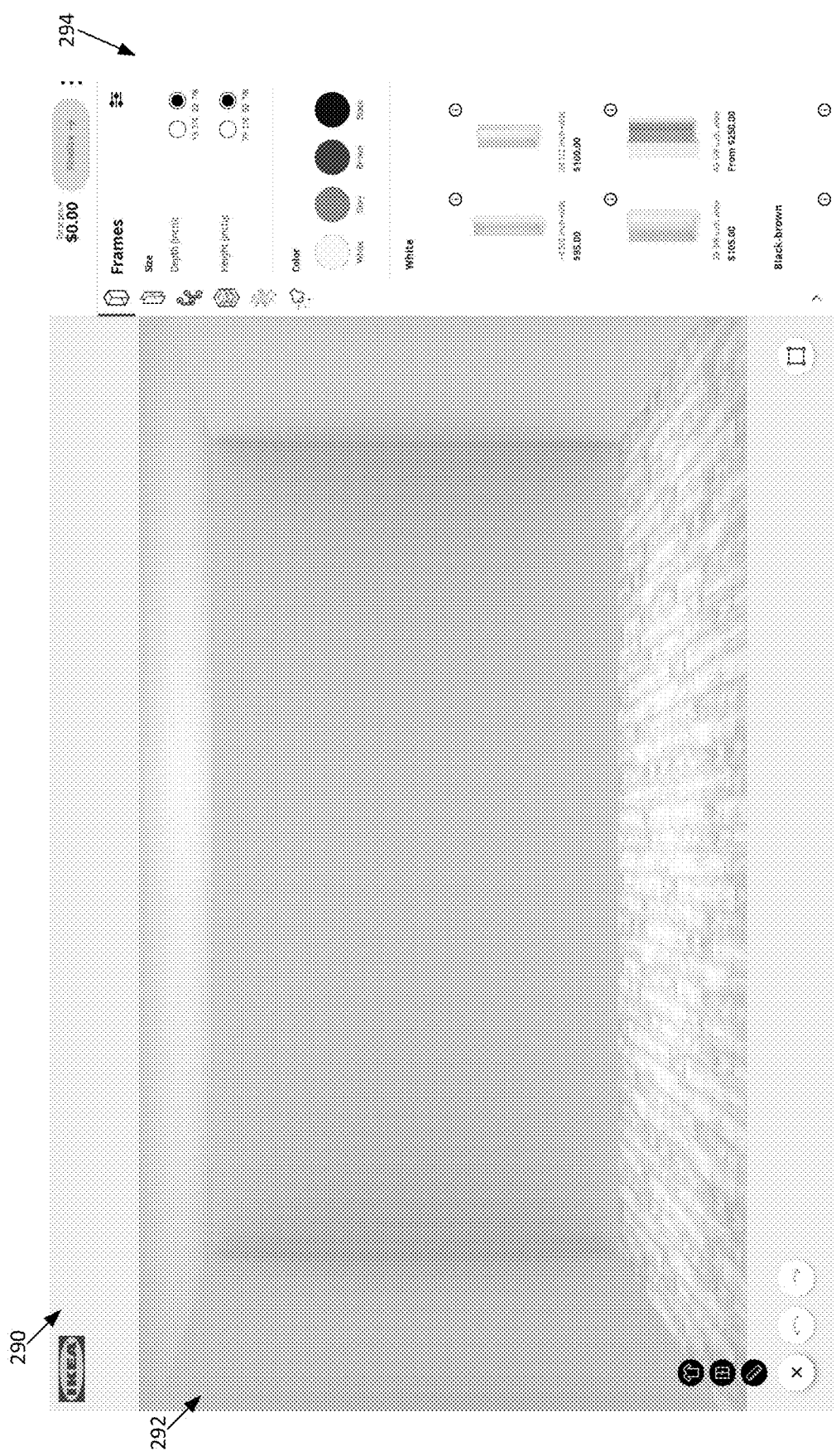
FIG. 8 illustrates an example user interface for a furnishing planner.

FIG. 8 illustrates an example user interface 290 for a furnishing planner. The user interface 290 displays a virtual room 292, and a furnishing selector 294.

The virtual room 292 is presented for placing a selected furnishing. In some examples, the virtual room 292 is a generic room with pre-set dimensions. In other examples, the virtual room 292 is customized by a user to match a physical room the user is planning to buy furniture for. In the example, shown the virtual room 292 is presented empty. In other examples, the virtual room 292 may be presented with objects already placed. For example, a user may select a virtual kitchen which includes various cabinets and appliances in a pre-set position.

The furnishing selector 294 presents options for selecting a furnishing item. The example shown includes a furnishing selector 294 which is narrowed down to storage frames. The example shown also includes various filters which a user can select to narrow which frames are selected. For example, a user can narrow frames by size, depth, height, and color.

Underneath the filters, a grid of products is presented to allow a user to select one or more products add to the virtual room 292.

Figure 9:
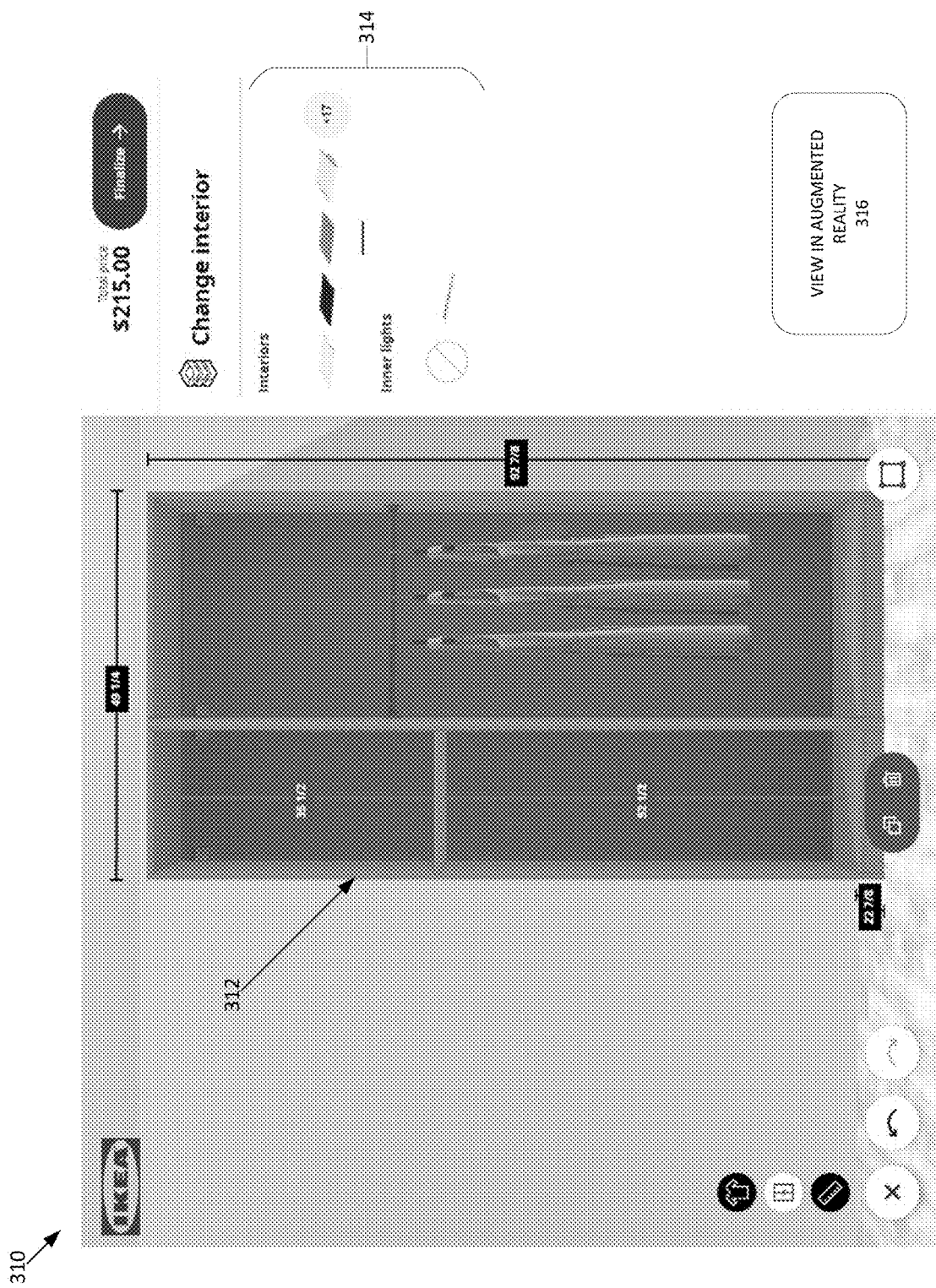
FIG. 9 illustrates an example user interface for a furnishing planner.

FIG. 9 illustrates an example user interface 310 for a furnishing planner. The user interface 310 includes a customized furnishing 312, a furnishing customizer 314, and a view in AR element 316. In this example, the customized furnishing 312 is a wardrobe. The furnishing customizer 314 presents options for selecting interior shelving and inner lights. In the example shown, the user is selecting an interior shelving piece. The example UI shown allows the user to modify the height of the shelving. Also shown are other dimensions of the customized furnishing.

The view in AR element 316 triggers an AR transfer service when selected. In some examples, this includes sending a message describing the customized furnishing to an AR reality conversion service and receiving a link to the customized furnishing in response. The link may be encoded in a machine-readable code which is presented to the user. In other examples, the transfer service encodes a description of the customized furnishing which is presented to the user.

Figure 10:
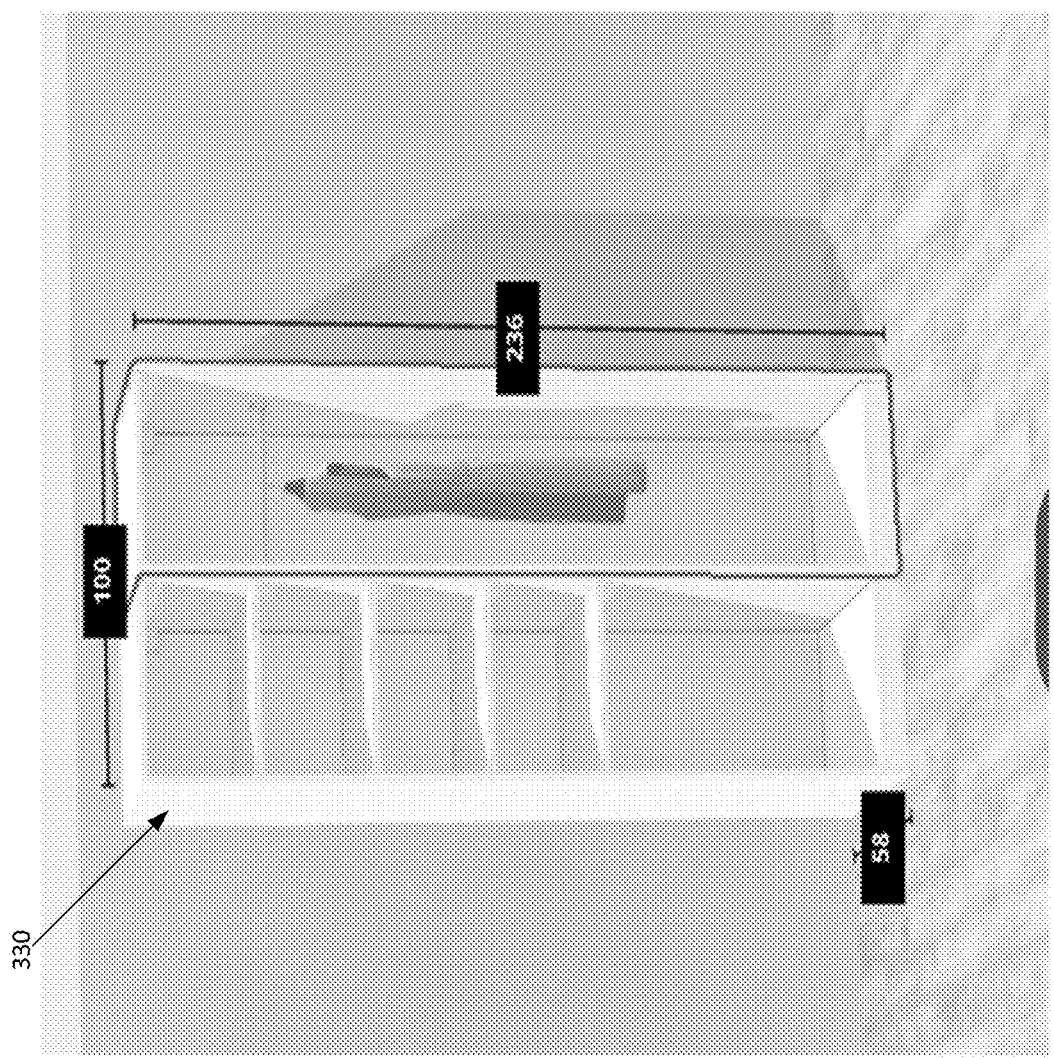
FIG. 10 illustrates an example customized furnishing.

FIG. 10 illustrates an example customized furnishing 330. The customized furnishing presented is a wardrobe with multiple shelves and a hanger unit. In some examples, the customized furnishing is described in JSON and sent to an AR conversion service to create an AR model. For example, the customized furnishing 330 can be described in JSON, in part, as:

```
{
    "application": "storageonepax",
    "itemList": {
        "item": [
            {
                "itemType": "ART",
                "itemNo": "80214568",
                "quantity": 2
            },
            {
                "itemType": "ART",
                "itemNo": "90256893",
                "quantity": 1
            },
            {
                "itemType": "ART",
                "itemNo": "30277959",
                "quantity": 4
            }
        ]
    },
    "configuration": {
        "version": "1.0",
        "content": {
            "entities": [
                {
                    "id": "4a39c443-19a0-4e75-95fe-308fa9290173",
                    "ref": "90256893",
                    "parent": "203a1694-fb42-4da8-a6cd-3588351c5485",
                    "needsResnap": false,
                    "c": {
                        "WorldTransformComponent": {
                            "p": {
                                "x": -1,
                                "y": 1945,
                                "z": 305
                            },
                            "r": {
                                "w": 1,
                                "x": 0,
                                "y": 0,
                                "z": 0
                            }
                        }
                    }
                },
                {
                    "id": "203a1694-fb42-4da8-a6cd-3588351c5485",
                    "ref": "80214568",
                    "parent": "48b0b5dc-8f85-40e3-9239-5cac279a7fa8",
                    "needsResnap": false,
                    "c": {
                        "WorldTransformComponent": {
                            "p": {
                                "x": 0,
                                "y": 1180,
                                "z": 290
                            },
                            "r": {
                                "w": 1,
                                "x": 0,
                                "y": 0,
                                "z": 0
                            }
                        }
                    }
                },
                ...
            ],
            "catalogs": {
                "pax": "0.0.2",
                "propping": "0.0.2",
                "ligths": "0.0.1"
            },
            "version": "1.3"
        }
    },
    "icf": {
        "version": "1.0",
        "content": {
            "icf_version": "1.0",
            "application_id": "storageonepax",
            "application_version": "1.9.4-38.g6ae1a509",
            "creation_datetime": "2021-03-22T20:26:29.600Z",
            "articles": [
                {
                    "id": 1,
                    "parent_ids": [ ],
                    "child_ids": [
                        2
                    ],
                    "product_id": "ART-80214568",
                    "name": "pax frame 500x2360x580",
                    "category": "PaxFrame",
                    "colors": [
                        "#fafafa"
                    ],
                    "attributes": { },
                    "dimensions": {
                        "x": 500,
                        "y": 2360,
                        "z": 580
                    },
                    "transform": {
                        "position": {
                            "x": 0,
                            "y": 1180,
                            "z": 290
                        },
                        "rotation": {
                            "x": 0,
                            "y": 0,
                            "z": 0
                        },
                        "scale": {
                            "x": 1,
                            "y": 1,
                            "z": 1
                        }
                    }
                },
                {
                    "id": 2,
                    "parent_ids": [
```

-continued

```
    1
  ],
  "child_ids": [ ],
  "product_id": "ART-90256893",
  "name": "pax cloth rail 500x54",
  "category": "PaxClothRail",
  "colors": [
    "#fafafa"
  ],
  "attributes": { },
  "dimensions": {
    "x": 464,
    "y": 56,
    "z": 54
  },
  "transform": {
    "position": {
      "x": -1,
      "y": 1945,
      "z": 305
    },
    "rotation": {
      "x": 0,
      "y": 0,
      "z": 0
    },
    "scale": {
      "x": 1,
      "y": 1,
      "z": 1
    }
  }
  },
  ...
  ],
  "meta": {
    "user_generated": false
  }
  }
}
```

Figure 11:
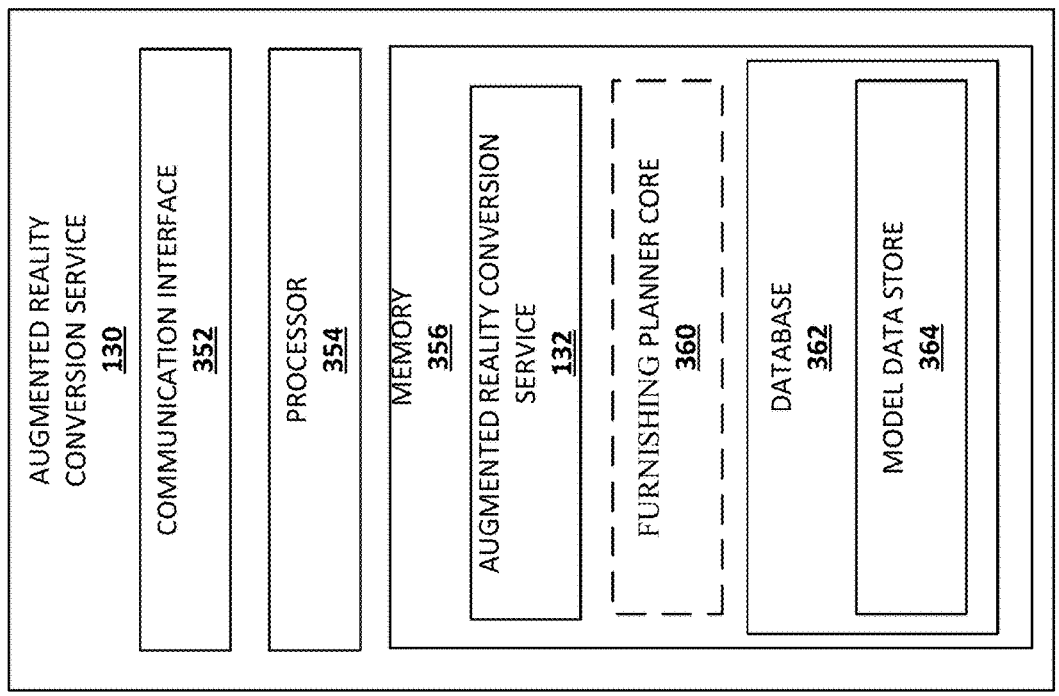
FIG. 11 illustrates an example augmented reality conversion service.

FIG. 11 illustrates an example augmented reality conversion service 130. The augmented reality conversion service 130 includes a communication interface 352, processor 354, and memory 356. The augmented reality conversion service 130 is example embodiment of the augmented reality conversion service 130 illustrated in FIG. 2.

In some examples, the augmented reality conversion service run on one or more servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services. Various combinations thereof are possible as well.

The communication interface 352 operates to allow the augmented reality conversion service 130 to communicate with the furnishing planer device and the augmented reality device. Typically, the communication interface 352 includes an interface to connect with a public or private network.

Examples of the processing device and the memory 186 are described in reference to FIG. 16. Referring to FIG. 11, The memory 356 operates an augmented reality converter 132, a furnishing planner core 360, and a database 362.

In some embodiments, the memory 356 operates an augmented reality converter 132. In some examples, the augmented reality conversion service 130 receives a message describing the customized furnishing item. In some examples the message is in a JSON format. The augmented reality converter 132 combines models of standard furnishing items and furnishing parts to create a customized furnishing model based on the customized furnishing described in the message. In some examples the augmented reality converter 132 will convert the customized model into an AR format or a 3D model format. In other examples, the augmented reality conversion service receives a message describing the parts of the customized furnishing which are used to generate a 3D model which is later converted to an AR format. In some examples, the augmented reality converter 132 waits to generate the customized model or convert the model into an AR format until a request from an AR device is received. This allows the augmented reality converter 132 to convert the customized model into an AR model which is compatible with the device requesting the customized model. Examples of 3D model formats include gITF, glb, and glb(draco). Examples of an AR format includes USDZ. In some examples the augmented reality converter 132 may check the model data store 364 to determine if a 3D or AR model already exists for the customized furnishing and provide a link to the model already created.

In some example embodiments, the memory 356 operates a furnishing planner core 360. The furnishing planner core 360 operates to provide the backend for the furnishing planner. For example, the furnishing planner core 360 can manage the furnishing session by providing a catalog of furnishing items, managing a customer's account, providing updated images based on selected customization, and other backend web application support.

The database 362 includes a model data store 364. The model data store 364 stores models for customized and standard furnishings. In some embodiments, the model data store includes models for various furnishings. The model data store 364 includes all the parts which may be added to a customized furnishing, and all modifications to a furnishing item. For example, the model data store 364 can include a model for a base wardrobe, and a model for different shelves and hanging racks which may be added to the wardrobe. Additionally, the model database may include other modifications for the wardrobe, such as different colors or materials. Accordingly, the model data store 364 can include models for all parts required to make a customized model based on selected customizations for a furnishing. In some examples, the data store may keep track of all or some customized furnishings which are submitted by customers. In some examples, these models may be used to determine which models, or customizations are popular. In some examples the mode data store is the model database 134 illustrated in FIG. 2.

In an embodiment, logic is included in the augmented reality converter 132 to only store the custom 3D model, and optionally the corresponding AR model, if the same custom 3D model has not been created before by a customer. If the same custom 3D model has been created the augmented reality conversion service will send the previously used link to the application and embedded in the machine-readable code.

Figure 12:
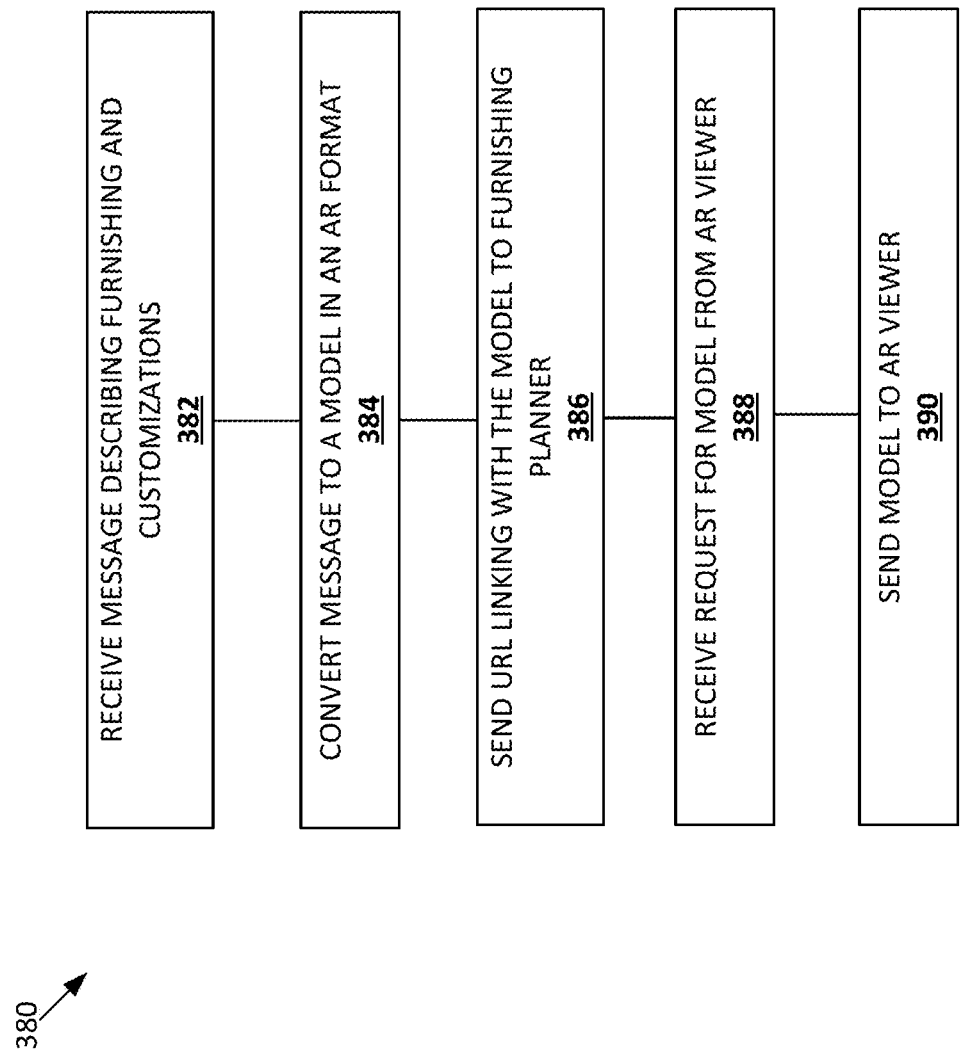
FIG. 12 illustrates an example method for converting a customized furnishing product to augmented reality.

FIG. 12 illustrates an example method 380 for converting a customized furnishing product to augmented reality. The method 380 includes the operations 382, 384, 386, 388, and 390. In the typical example, the method 380 is performed by the augmented reality conversion service 130 as illustrated in FIG. 2. In other examples, the method 380 is performed by an AR device.

The operation 382 receives a message describing a selected furnishing and a selected customization. In some examples, the message is in a JSON format and describes a furnishing product and each customization. In some examples, the furniture planner creates a 3D model (for example in a gITF, glb, or glb(draco)) which is received at the AR conversion service. In some examples, the messages may include several selected furnishing items. Additionally, in some examples, the message may be a series of messages.

The operation 384 take the customized furnishing described in the message and generates a model in an AR format. In some examples, the model is a 3D model of the customized furnishing, such as gITF. In some embodiments, the message describes a 3D model which is created and then converted into an AR model. In other models the AR mode is created from the 3D version of the parts of the furnishing, which exists in a model database, without creating a full customized 3D model. Examples of an AR format include USDZ. The model can be in any format which allows an AR viewer to display the customized furnishing.

In some examples, the operation 384 converts the model described in the message into a plurality of AR model formats which are compatible with a range of different devices. For example, the AR conversion service can handle a request by an AR device by sending a certain format depending on the operating system of the AR device. In some examples, the AR conversion service will not convert the model described in the message to an AR format until it is aware of what format the AR viewer is compatible with.

Alternatively, the conversion to the AR format can occur at the augmented reality device. For example, the augmented reality conversion service can send a model in a 3D format to an augmented reality device which will convert the model to a compatible AR format.

The operation 386 sends a link to the model. In the typical example, the link is a URL which links to the AR model. In other examples, the link is an ID which can be used to return the AR model from a database. In some examples, the link is sent to a furnishing planner device. Typically, the link is sent to the device which sent the message describing the customized furnishing item.

The operation 388 receives a request for the model from an AR viewer. In some examples the AR viewer receives the link by scanning a machine-readable code on the furnishing planner device. The AR viewer will request one or more customized furnishings which the user would like to view in AR.

The operation 390 sends model to the AR viewer. Typically, at the operation 390 the customized furnishing which was converted to an AR model at the operation 384 is sent to the AR viewer. In some examples, the customized furnishing in a 3D format is sent to the AR viewer which will convert the model to a compatible AR format. In some examples, the AR conversion service will determine which type of device the AR viewer is and send an AR model which is compatible with that device.

Figure 13:
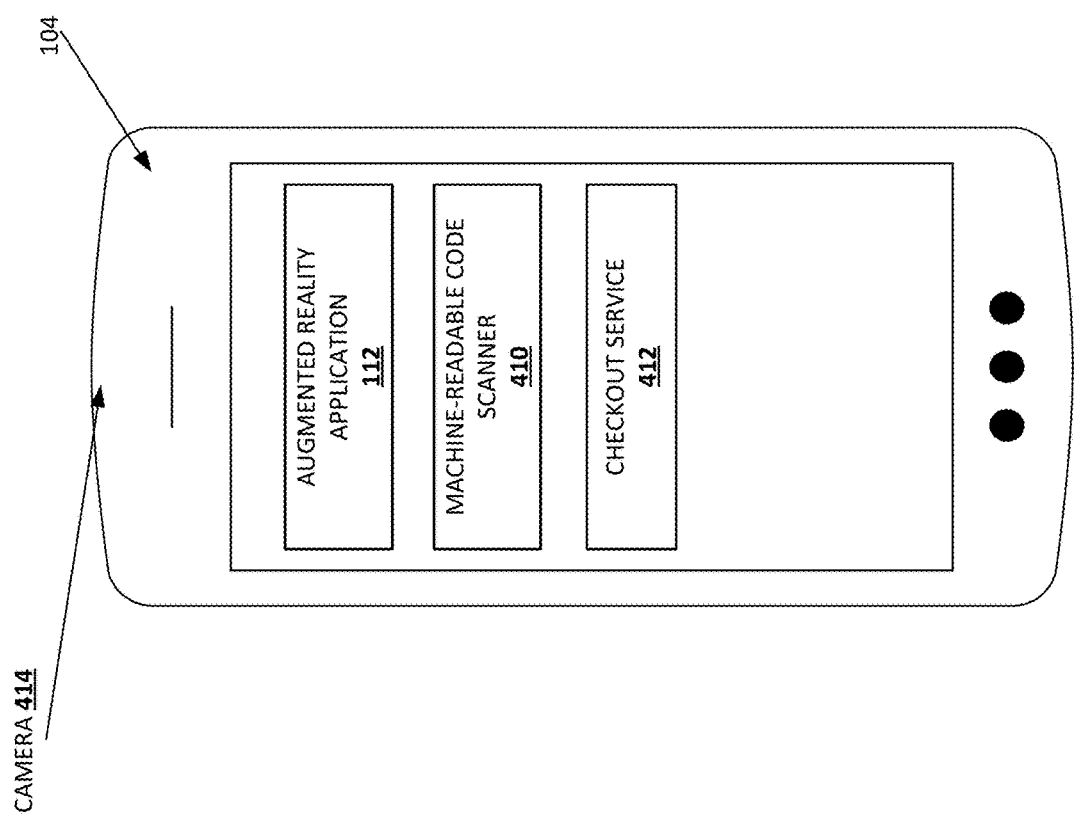
FIG. 13 illustrates an example augmented reality device.

FIG. 13 illustrates an example augmented reality device 104. In the embodiment shown, the augmented reality device 104 includes a camera 414, an augmented reality viewer 112, a machine-readable code scanner 410, and a checkout service 412.

In many examples the camera 414 operates with the machine-readable code scanner 410 to capture the machine-readable code. The machine-readable code allows the augmented reality device 104 to present a customized furnishing in AR. The camera 414 also operates with the augmented reality viewer 112. In some examples, the camera captures images which are used by the augmented reality viewer 112. These images overlayed with the customized furnishing.

Figure 15:
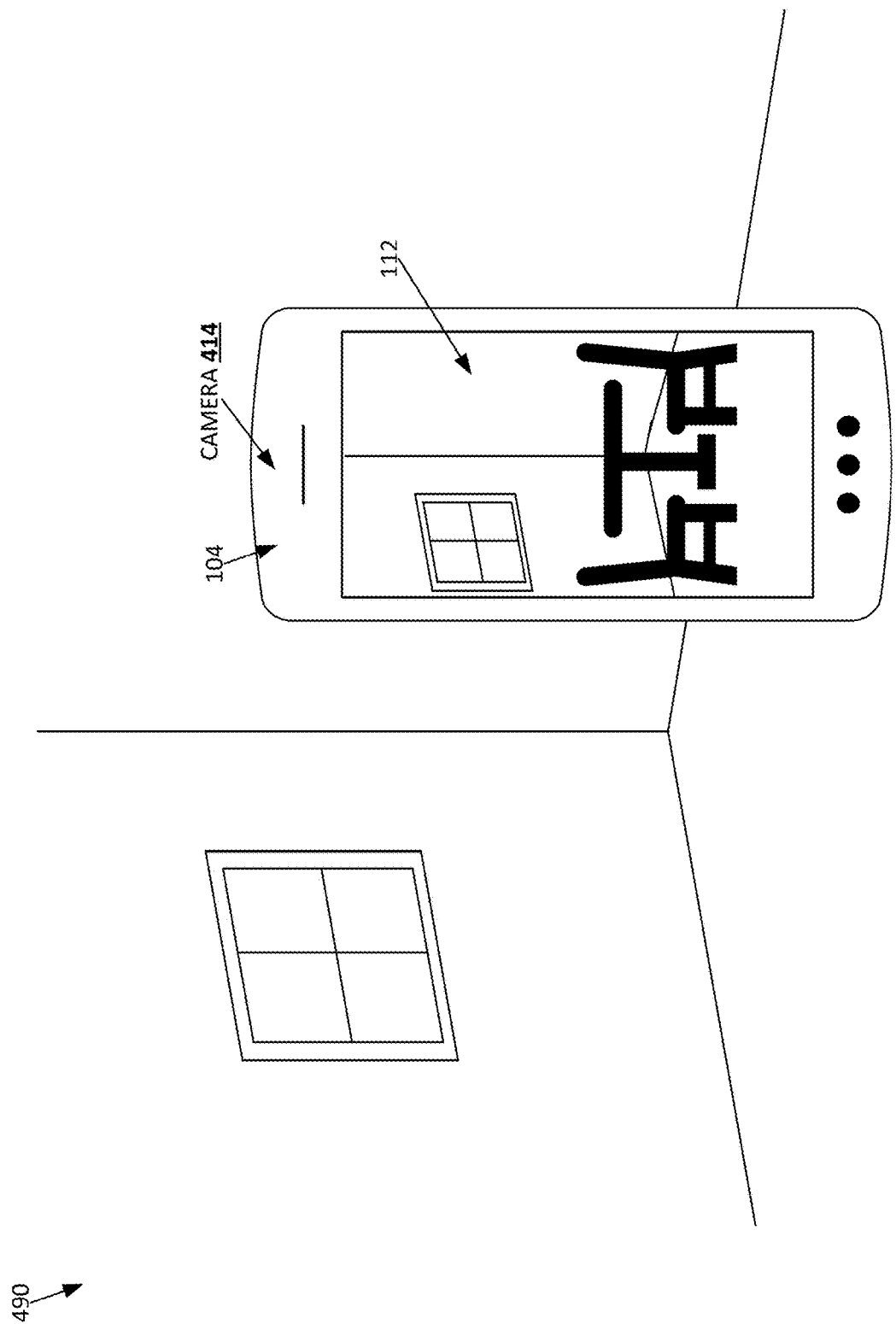
FIG. 15 illustrates an example augmented reality scene.

The augmented reality viewer 112 operates to present the furnishing product in AR. Alternatively, in some examples, the furnishing product may be displayed in virtual reality or mixed reality. The augmented reality viewer 112 allows a user to place the furnishing item in their house and view the product as if it was placed at that location through the augmented reality device 104. This allows a customer to easily visualize the product in different locations. In some embodiments, a user can further modify or customize a furnishing product in AR in real-time through the augmented reality viewer 112. In some examples, the augmented reality viewer 112 is built-in the phone or is a third-party application. In other examples, the augmented reality viewer 112 is an application built by the company owning or running the furnishing store. An example of the augmented reality viewer 112 operating in an AR scene is illustrated in FIG. 15.

In some examples, the augmented reality device operates a checkout service 412. The checkout service 412 allows a user to finalize a purchase of a selected furnishing. In some examples, after a user views a furnishing product in AR the user may add the product with the customizations to a shopping cart. In some examples, the checkout service 412 also facilitates the delivery and payment processes.

Figure 14:
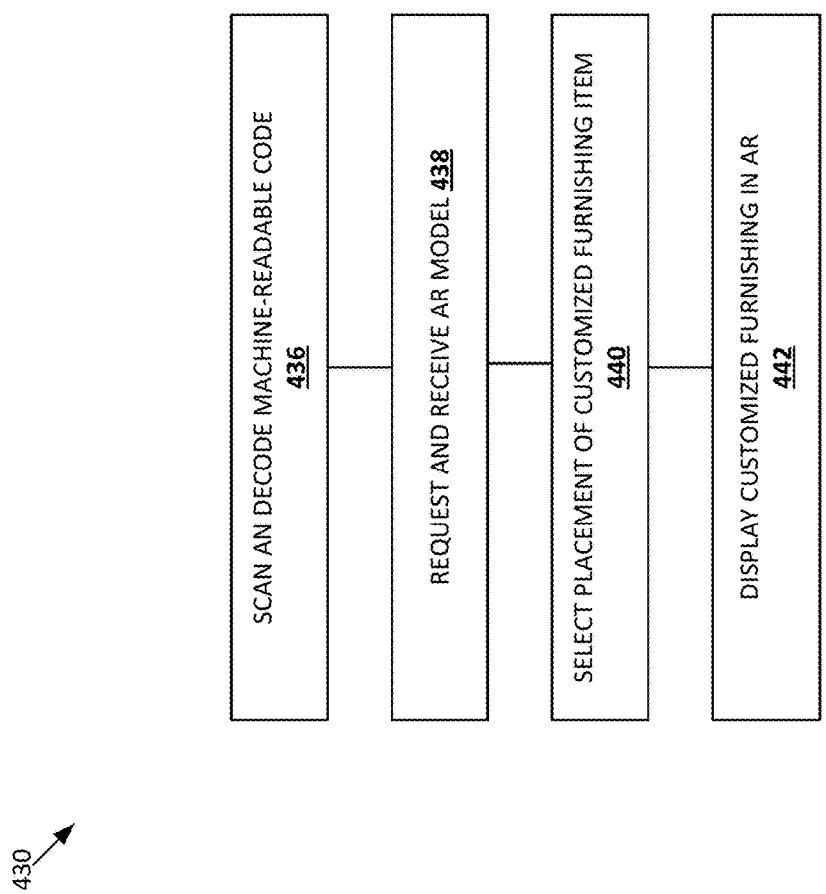
FIG. 14 illustrates an example method for receiving a customized furnishing on an augmented reality device.

FIG. 14 illustrates an example method 430 for receiving a customized furnishing on an augmented reality device. The method 430 includes the operations 436, 438, 440, 442, and 444. The method 430 is typically performed on the augmented reality device 104 illustrated and described in FIG. 1.

The operation 436 scans and decodes a machine-readable code. In some examples, the augmented reality device 104 includes a camera which scans a machine-readable code. The augmented reality device 104 decodes the machine-readable code. In some examples, the augmented reality device 104 will automatically open an augmented reality viewer after decoding the machine-readable code. This is typically referred to as deep linking. In some embodiments, the machine-readable code includes a link to an AR model of one or more customized furnishing products. In other embodiments the machine-readable code includes a message describing one or more customized furnishing products.

In some embodiments, the method 430 includes the operation 438 which requests and receives an AR model. The AR device sends a request of an AR model of the customized furnishings. In some examples, the AR device will include a required format in the request. The AR device receives an AR model from the AR conversion service.

In some embodiments the method 430 includes the operation 440. The operation 440 selects a placement of the customized furnishing item. In some examples, a user may wish to place the furnishing item in the AR viewer, so it appears in a specific location in a room. For example, a user may wish to put a couch in the corner of the room. The AR device will receive inputs which allow the user to select and orientate the customized furnishing in the AR viewer.

The operation 442, displays the customized furnishing in AR. The AR viewer will place the 3D model over images received from a camera. In some examples, the furnishing overlayed the image will adjust to correspond to the angle and location of the AR device. This allows a user to view the customized furnishing in augmented reality as if the furnishing was in the selected place.

FIG. 15 illustrates an example augmented reality scene 490. The augmented reality scene 490 includes the augmented reality device 104.

In some examples, the augmented reality scene 490 is a room in a house where a customer is interested in purchasing a furnishing item. In the example shown, the augmented reality scene 490 is a corner of a room which the customer is interested in placing a table and chairs. As the user moves around the augmented reality scene 490 the 3D model is displayed as if the furnishing item was placed at the specific location.

The augmented reality device 104 is a computing device which includes augment reality, virtual reality, or mixed reality. In some examples, the AR viewer allows the customer to easily move around a home and visualize the furnishing at different places. The augmented reality device 104 is discussed in FIG. 13.

FIG. 16 illustrates an exemplary architecture of a computing device 752 that can be used to implement aspects of the present disclosure, including any of the plurality of computing devices described herein. The computing device 752 illustrated in FIG. 16 can be used to execute the operating system, application programs, and software described herein.

Examples of computing devices suitable for the computing device 752 include a desktop computer, a laptop computer, a tablet computer, a mobile computing device (such as a smartphone, mobile digital device, or other mobile devices), a computing device coupled with a kiosk, or other devices configured to process digital instructions.

The system memory 764 includes read only memory 766 and random-access memory 768. A basic input/output system 770 containing the basic routines that act to transfer information within computing device 752, such as during start up, is typically stored in the read only memory 766.

The computing device 752 also includes a secondary storage device 760 in some embodiments, such as a hard disk drive, for storing digital data. The secondary storage device 760 is connected to the system bus 761 by a secondary storage interface 762. The secondary storage devices 760 and their associated computer readable media provide nonvolatile storage of computer readable instructions (including application programs and program modules), data structures, and other data for the computing device 752.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 760 or memory 764, including an operating system 772, one or more application programs 776, other program modules 774 (such as the software described herein), and program data 778. The computing device 752 can utilize any suitable operating system.

In some embodiments, a user provides input to the computing device 752 through one or more input devices. Examples of input devices include a keyboard 782, mouse 784, microphone 786, and touch sensor 788 (such as a touchpad or touch sensitive display). Other embodiments include other input devices. The input devices are often connected to the processing device 754 through an input/output interface 780 that is coupled to the system bus 761. These input devices can be connected by any number of input/output interfaces, such as a parallel port, serial port, game port, or a universal serial bus. Wireless communication between input devices and the interface is possible as well, and includes infrared, BLUETOOTH® wireless technology, 802.11a/b/g/n, cellular, or other radio frequency communication systems in some possible embodiments.

In this example embodiment, a display device 790, such as a monitor, liquid crystal display device, projector, or touch sensitive display device, is also connected to the system bus 761 via an interface, such as a video adapter 756. In addition to the display device 790, the computing device 752 can include various other peripheral devices (not shown), such as speakers or a printer.

When used in a local area networking environment or a wide area networking environment (such as the Internet), the computing device 752 is typically connected to the network through a network interface 758, such as an Ethernet interface. Other possible embodiments use other communication devices. For example, some embodiments of the computing device 752 include a modem for communicating across the network.

The computing device 752 typically includes at least some form of computer readable media. Computer readable media includes any available media that can be accessed by the computing device 752. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 752.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 1 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
a computing device including a memory storage device, the memory storage device storing instructions that, when executed by the computing device, cause the computing device to:
generate and display a furnishing planner;
receive inputs to select a furnishing product and one or more furnishing parts to combine with the furnishing product;
upload a model generation message to a server to instruct the server to combine a three-dimensional model of the furnishing product with one or more three-dimensional models corresponding with the one or more furnishing parts according to the inputs to generate a customized three-dimensional model of the furnishing product with the one or more furnishing parts;
receive, from the server, a link to the customized three-dimensional model of the furnishing product with the one or more furnishing parts in an augmented reality format on the server; and
generate and display a machine-readable code including the link which when scanned by an augmented reality device allows the augmented reality device to display the customized three-dimensional model of the furnishing product with the one or more furnishing parts in the augmented reality format on an augmented reality viewer,
wherein the augmented reality format of the customized three-dimensional model of the furnishing product with the one or more furnishing parts is selected from a plurality of augmented reality formats based on a compatibility of the augmented reality device.

2. The system of claim 1, wherein the furnishing planner further includes:
a user interface for:
selecting one or more furnishings from a catalog of furnishings and a catalog of furnishing parts for each of the one or more furnishings.

3. The system of claim 1, wherein the instructions when executed by the computing device further cause the computing device to:
receive inputs to select a plurality of furnishings; and
wherein the augmented reality device is further configured to display each of the plurality of furnishings.

4. The system of claim 1, wherein the augmented reality device is a mobile computing device.

5. The system of claim 1, wherein the link includes an identifier that can be used to return the customized three-dimensional model of the furnishing product with the one or more furnishing parts in an augmented reality format from a database.

6. A method comprising:
generating and displaying a furnishing planner;
receiving inputs selecting a furnishing product and one or more furnishing parts to combine with the furnishing product;
uploading a model generation message to a server instructing the server to combine a three-dimensional model of the furnishing product with one or more three-dimensional models corresponding with the one or more furnishing parts according to the inputs to generate a customized three-dimensional model of the furnishing product with the one or more furnishing parts;
receiving, from the server, a link to the customized three-dimensional model of the furnishing product with the one or more furnishing parts in an augmented reality format on the server; and
generating and displaying a machine-readable code including the link which when scanned by an augmented reality device allows the augmented reality device to display the customized three-dimensional model of the furnishing product with the one or more furnishing in the augmented reality format on an augmented reality viewer,
wherein the augmented reality format of the customized three-dimensional model of the furnishing product with the one or more furnishing parts is selected from a plurality of augmented reality formats based on a compatibility of the augmented reality device.

7. The method of claim 6, the method further comprising:
receiving inputs to select a plurality of furnishings; and
wherein the augmented reality device is further configured to display each of the plurality of furnishings.

8. The method of claim 6, wherein the furnishing planner further includes selecting the one or more furnishing products from a catalog of furnishing products and a catalog of furnishing parts for each of the one or more furnishing products.

9. The method of claim 8, wherein the furnishing planner further includes placing the furnishing product with the one or more furnishing parts in a virtual room.

10. The method of claim 8, wherein the furnishing planner further includes a button which when selected initiates generating the machine-readable code.

11. The method of claim 6, the method further comprising:
receiving inputs to initiate a checkout process.

12. A method comprising:
scanning a machine-readable code, wherein the machine-readable code is generated by a furnishing planner on a computing device which receives inputs selecting a furnishing product and one or more furnishing parts and uploads a model generation message to a server to instruct the server to combine a three-dimensional model of the furnishing product with one or more three-dimensional models corresponding with the one or more furnishing parts according to the inputs to generate a customized three-dimensional model of the furnishing product with the one or more furnishing, wherein the machine-readable code includes a link to the customized three-dimensional model of the furnishing product with the one or more furnishing parts in an augmented reality format on the server; and
generating an augmented reality viewer which includes displaying the customized three-dimensional model of the furnishing product with the one or more furnishing parts in the augmented reality format based on the scanned machine-readable code,
wherein the augmented reality format of the customized three-dimensional model of the furnishing product with the one or more furnishing parts is selected from a plurality of augmented reality formats based on a compatibility of the augmented reality viewer.

13. The method of claim 12, wherein scanning the machine-readable code is further encoded to cause the augmented reality viewer to open.

14. The method of claim 12, wherein the augmented reality viewer further includes receiving live images from a camera and overlaying the furnishing product with the one or more furnishing parts over the live images.

15. The method of claim 12, the method further comprising:
    receiving inputs placing the furnishing product with the one or more furnishing parts in the augmented reality viewer.

16. The method of claim 12, the method further comprising:
    receiving inputs modifying one of the one or more furnishing parts.

17. The method of claim 12, the method further comprising:
    receiving inputs initiating a checkout procedure for the furnishing product with the one or more furnishing parts.

* * * * *